United States Patent
Kobayashi et al.

(10) Patent No.: US 7,094,828 B2
(45) Date of Patent: Aug. 22, 2006

(54) OLEFIN THERMOPLASTIC ELASTOMER COMPOSITION

(75) Inventors: Kyoko Kobayashi, Ichihara (JP); Hiroyasu Yamaoka, Ichihara (JP); Yuichi Itoh, Ichihara (JP); Akira Uchiyama, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/199,066

(22) Filed: Jul. 22, 2002

(65) Prior Publication Data

US 2003/0065081 A1    Apr. 3, 2003

Related U.S. Application Data

(63) Continuation of application No. 08/959,632, filed on Oct. 28, 1997, now abandoned.

(30) Foreign Application Priority Data

Oct. 28, 1996    (JP)    ................................. 8-285121

(51) Int. Cl.
*C08J 3/22*    (2006.01)
(52) U.S. Cl. ...................... 524/525; 524/528
(58) Field of Classification Search ................ 524/525, 524/528, 530
See application file for complete search history.

(56) References Cited

U.S. PATENT DOCUMENTS

| 4,087,485 A | * | 5/1978 | Huff ........................... 525/193 |
| 4,212,787 A | * | 7/1980 | Matsuda et al. ........... 260/33.6 |
| 5,656,693 A | * | 8/1997 | Ellulo et al. ................ 525/171 |

FOREIGN PATENT DOCUMENTS

JP    08-27316 A    1/1996

\* cited by examiner

*Primary Examiner*—Peter D. Mulcahy
(74) *Attorney, Agent, or Firm*—Buchanan Ingersoll PC

(57) ABSTRACT

An olefin thermoplastic elastomer composition which is superior in the resistance to oils, heat resistance, formability and flexibility is provided, said elestomer composition comprising the components (A) 40–90 parts by weight of a polypropylene resin having a melt flow rate (determined at 230 ° C. under a load of 2.16 kg according to ASTM D 1238) of 0.1–5 g/10 minutes, (B) 10–60 parts by weight of a copolymer rubber based on olefin, the contents of the components (A) and (B) summing up to 100 parts by weight, and (C) 20–150 parts by weight of a softener,
wherein the composition is in such a cross-linked state that the gel content thereof amounts to 97% by weight or higher.

3 Claims, No Drawings

OLEFIN THERMOPLASTIC ELASTOMER COMPOSITION

CROSS REFERENCE TO RELATED APPLICATION

This application is a continuation of application Ser. No. 08/959,632, filed on Oct. 28, 1997 now abandoned, which claims priority from Japanese Patent Application 285121/1996 filed Oct. 28, 1996.

FIELD OF THE INVENTION

The present invention relates to an olefin thermoplastic elastomer composition and, more specifically, to a thermoplastic elastomer composition based on olefin which can serve favorably for substitute for vulcanized rubber.

DESCRIPTION OF THE RELATED TECHNIQUES

Thermoplastic elastomers based on olefin are light weighing and easy to reuse by recycling, so that they find wide use as energy-sparing and resources-sparing elastomers especially as substitute for vulcanized rubber for, such as automobile parts, parts for industrial machines, parts for electric and electronic insruments and for construction purposes.

However, olefin thermoplastic elastomers of the prior art exhibit low resistance to oils and, in particular, they suffer from a problem that they become swollen when they are brought into contact with aromatic organic solvents and nonpolar solvents, such as gasoline, mineral oils and they like, whereby their application field is restricted.

By the present invention, it is contemplated to obviate the problems in the prior art and to provide an olefin thermoplastic elastomer composition superior in the resistance to oils.

SUMMARY OF THE INVENTION

An object of the present invention is, thus, to obviate the problems in the prior art and to provide an olefin thermoplastic elastomer composition which is superior in the resistance to oils, heat resistance, formability and flexibility.

The olefin thermoplastic elastomer composition according to the present invention comprises the components (A) 40–90 parts by weight of a polypropylene resin under a load of 2.16 kg according to ASTM D 1238) of 0.1–5 g/10 minutes, (B) 10–60 parts by weight of a copolymer rubber based on olefin, the contents of the components (A) and (B) summing up to 100 parts by weight, and (C) 20–150 parts by weight of a softener, wherein the composition is in such a cross-linked state that the gel content thereof amounts to 97% by weight or higher.

DETAILED DESCRIPTION OF THE DISCLOSURE

<<The Polypropylene Resin (A)>>

The polypropylene resin (A) to be employed according to the present invention has a melt flow rate (MFR, determined at 230° C. under a load of 2.16 kg according to ASTM D 1238, the same being the case in the following) of 0.1–5 g/10 minutes, preferably 0.5–3 g/10 minutes, and may concretely be exemplified by the polymer or copolymer as given below:

1) Homopolymer of propylene
2) Random copolymers of propylene with 10 mole % or less of other α-olefin(s)
3) Block copolymers of propylene with 30 mole % or less of another α-olefin.

As the above-mentioned α-olefin, there may be exemplified concretely α-olefins having 2 or 4–20 carbon atoms, such as ethylene, 1-butene, 4-methyl-1-pentene, 1-hexene, 1-octene and the like.

Polypropylene homopolymer as mentioned above is preferred as the polypropylene resin (A).

The polypropylene resin (A) can be used either alone or in combination.

If the melt flow rate (MFR) of the polypropylene resin (A) is within the above-mentioned range, an olefin thermoplastic elastomer composition exhibiting a superior resistance to oils with a better formability according to the present invention can be obtained.

In the olefin thermoplastic elstomer composition according to the present invention, the polypropylene resin (A) is incorporated therein in a proportion of 40–90 parts by weight, preferably 50–90 parts by weight, per 100 parts by weight of the sum of the polypropylene resin (A) and the copolymer rubber based on olefin (B).

When the polypropylene resin (A) is used in a proportion within the above-mentioned range, an olefin thermoplastic elestomer composition superior in the resistances to oils and to heat and in the formability can be obtained.

<<The Copolymer Rubber based on Olefin (B)>>

As the copolymer rubber based on olefin to be used according to the present invention, there may be exemplified an amorphous elastomeric random copolymer having a content of α-olefin of 2–20 carbon atoms of 50 mole % or higher. Examples of such an amorphous elastomeric random copolymer include α-olefin copolymers made of two or more α-olefins and copolymers of α-olefin/non-conjugated diene made of two or more α-olefins and a non-conjugated diene and, concretely, the following rubbers may be exemplified:

1) Ethylene/another α-olefin copolymer rubber with a mole ratio of ethylene/another α-olefin in the range of about 90/10–50/50
2) Ethylene/another α-olefin/non-conjugated diene copolymer rubber with a mole ratio of ethylene/another α-olefin in the range of about 90/10–50/50
3) Propylene/another α-olefin copolymer rubber with a mole ratio of propylene/another α-olefin in the range of about 90/10–50/50
4) Butene/another α-olefin copolymer rubber with a mole ratio of butene/another α-olefin in the range of about 90/10–50/50

Concrete examples of the α-olefin include ethylene, propylene, 1-butene, 4-methyl-1-pentene, 1-hexene and 1-octene.

As the non-conjugated diene, there may be exemplified concretely dicyclopentadiene, 1,4-hexadiene, cyclooctadiene, methylenenorbornene and ethylidene-norbornene.

The iodine value of the ethylene/α-olefin/non-conjugated diene rubber of above 2) having copolymerized non-conjugated diene may preferably be 25 or less.

Among the copolymer rubbers of above 1) to 4), those having a Mooney viscosity [$ML_{1+4}$(100° C.)] in the range of 10–250, preferably 30–150 are favorable.

In the olefin thermoplastic elastomer composition according to the present invention, the copolymer rubber based on olefin (B) is employed in a proportion of 10–60 parts by weight, preferably 10–50 parts by weight, per 100 parts weight of the sum of the polypropylene resin (A) and the copolymer rubber based on olefin (B).

When the copolymer rubber based on olefin (B) is used in an amount in the above range, an olefin thermoplastic elastomer composition capable of providing a formed product exhibiting superior resistance to oils and superior flexibility can be obtained.

In the composition according to the present invention, it is permissible to incorporate rubber(s) other than the copolymer rubber based on olefin (B). Thus, for example, diene rubbers, such as styrene/butadiene rubber (SBR), nitrile rubber (NBR), natural rubber (NR) and butyl rubber (IIR) as well as polyiso-butylene rubber, may be incorporated in combination with the copolymer rubber based on olefin (B).

<<The Softener (C)>>

For the softener (C) to be incorporated in the composition according to the present invention, those which are commonly employed for ordinary rubbers are favorable. Concrete examples of the softener (C) include petroleum products, such as process oils, lubricating oils, paraffins, liquid paraffin, polyethylene wax, petroleum asphalt and vaseline; coal tar products, such as coal tar and coal tar pitch; fatty oils, such as castor oil, linseed oil, rape oil, soybean oil and coconut oil; waxes, such as tall oil, beeswax, carnauba wax and lanoline; fatty acids and metal salts thereof, such as ricinoleic acid, palmitic acid, stearic acid, 12-hydroxystearic acid, montanic acid, oleic acid and erucic acid; synthetic high polymeric substances, such as petroleum resin, cumaron-indene resin and atactic polypropylene; ester-based softeners, such as dioctyl phthalate, dioctyl adipate and dioctyl sebacate; and others including microcrystalline wax, liquid polybutadiene and modification products and hydrogenated products thereof and liquid Thiokols.

In the thermoplastic elastomer composition according to the present invention, the softener (C) may be incorporated at a proportion in the range of 20–150 parts by weight, preferably 25–100 parts by weight, more preferably 30–80 parts by weight, per 100 parts by weight of sum of the polypropylene resin (A) and the copolymer rubber based on olefin (B).

When the softener (C) is used in an amount in the above range, an olefin thermoplastic elastomer composition capable of bringing about a formed product superior in the resistance to oils and in the flexibility can be obtained.

<<Other Components>>

In the thermoplastic elastomer composition according to the present invention, additives, such as heat stabilizer, antioxidant, weathering stabilizer, antistatic, fillers, colorants and lubricant may, if necessary, be incorporated within a range not obstructing the purpose of the present invention.

<<The Olefin Thermoplastic Elastomer Composition>>

The olefin thermoplastic elastomer composition according to the present invention contains the above-mentioned components, namely, the polypropylene resin (A), the copolymer rubber based on olefin (B) and the softener (C) each in a proportion defined above and has such a degree of cross linking that the gel content, namely the content of cyclohexane-insoluble matter, will amount to 97% by weight or more, preferably 97–103% by weight, determined by the method described afterwards with the aid of the calculation equation (1) given below. The gel content may in some cases exceed over 100%.

<Method for Determining the Gel Content (Cyclohexane-Insoluble Matter)>

About 100 mg of a sample of an olefin thermoplastic elastomer composition are taken out and are weighed precisely. This sample is cut into small pieces of 0.5 mm×0.5 mm×0.5 mm size and the resulting cut sample is immersed in 30 ml of cyclohexane in a closed vessel and held at 23° C. for 48 hours.

Then, the remaining sample left undissolved is taken out on a filter paper and is dried at room temperature for over 72 hours until a constant weight is reached. The subtracted value of the weight of the dried residue minus the weight of the components insoluble in cyclohexane other than the polymer components (namely, fibrous filler, filler, pigments and so on) is taken as the "corrected final weight (Y)".

On the other hand, the subtracted value of the initial weight of the sample minus the weight of the sum of the components soluble in cyclohexane, (namely, the softener and the like) and the components insoluble in cyclohexane other than the polymer components (namely, fibrous filler, filler, pigments and so on) is taken as the "corrected initial weight (X)".

Now, the gel content (components insoluble in cyclohexane) is obtained by the following calculation equation (1)

$$\text{Gel content (wt. \%)} = \frac{[\text{corrected final weight }(Y)]}{[\text{corrected initial weight }(X)]} \times 100 \quad (1)$$

<<Preparation of the Olefin Thermoplastic Elastomer Composition>>

The olefin thermoplastic elastomer composition according to the present invention can be prepared by blending the polypropylene resin (A), the copolymer rubber based on olefin (B) and the softener (C) together in a proportion defined above and subjecting the resulting mixture to cross linking. It is preferable to carry out the cross linking by a dynamic heat treatment in the presence of an organic peroxide.

As the organic peroxide, there may be enumerated concretely, for example, dicumyl peroxide, di-tert-butyl peroxide, 2,5-dimethyl-2,5-di-(tert-butyl-peroxy)hexane, 2,5-dimethyl-2,5-di-(tert-butylperoxy)-hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxy benzoate, tert-butylperoxyisopropyl carbonate, diacetyl peroxide, lauroyl peroxide and tert-butylcumyl peroxide.

Among them, 2,5-dimethyl-2,5-di-(tert-butylperoxy)hexane, 2,5-dimethyl-2,5-di-(tert-butylperoxy)-hexyne-3,1,3-bis(tert-butylperoxyisopropyl)benzene, 1,1-bis(tert-butylperoxy)-3,3,5-trimethylcyclohexane and n-butyl-4,4-bis(tert-butylperoxy)valerate are preferred in respect of their odour and scorching stability, wherein special preference is given to 1,3-bis(tert-butylperoxyisopropyl)benzene and 2,5-dimethyl-2,5-di-(tert-butylperoxy)hexane.

The organic peroxide is used in an amount in the range of 0.4–3 parts by weight, preferably 0.6–2 parts by weight per 100 parts by weight of the sum of the polypropylene resin (A) plus the copolymer rubber based on olefin (B). When the amount of the organic peroxide is in the above defined range, an olefin thermoplastic elastomer composition can be obtained, which is present in such a cross-linked state that its gel content is at least 97% by weight.

On subjecting the composition to cross linking using organic peroxide, it is permissible to incorporate in the composition one or more additional components, for example, a cross linking assistant, such as sulfur, p-quinone dioxime, p,p'-dibenzoylquinone dioxime, N-methyl-N-4-dinitrosoaniline, nitrosobenzene, diphenyl-guanidine or trimethylolpropane-N,N'-m-phenylenedimale-imide; one or more polyfunctional vinyl monomers, such as divinylbenzene; one or more polyfunctional methacrylate monomers, such as ethylene glycol dimethacrylate, diethylene glycol dimethacrylate, polyethylene glycol dimethacrylate, trimethylolpropane trimethacrylate and allyl methacrylate; and/or one or more polyfunctional allyl compounds, such as triallyl cyanurate.

When such additional components given above are incorporated in the composition upon its cross linking treatment with an organic peroxide, a uniform and mild cross linking reaction can be expected. Among the compounds given above, divinylbenzene is at the most preferable. Divinylbenzene is easy in handling, better in the compatibility with the principal components, namely, the polypropylene resin (A) and the copolymer rubber based on olefin (B), and has a function of solubilizing the organic peroxide and, thus, acts as a dispersant, whereby an olefin thermoplastic elastomer composition exhibiting a uniform effect of cross linking upon the heat treatment and having a better balance between the flowability and the material property can be obtained.

It is favorable to incorporate the cross linking assistant or the polyfunctional vinyl monomer(s) in the composition according to the present invention in an amount in the range of 0.4–3%, preferably 0.6–2%, based on the total weight of the entire mixture to be subjected to the cross linking treatment. When the incorporated amount of the cross linking assistant or of the polyfunctional vinyl monomer(s) is in the range given above, the resulting olefin thermoplastic elastomer composition will not suffer from a change in the material property of the formed product thereof caused by a thermal hysteresis during the forming procedure and is superior in the flowability, since the cross linking assistant or the polyfunctional vinyl monomer(s) will not remain in the cross-linked composition as unreacted monomer.

The dynamic heat treatment is carried out by kneading the mixture of the components in a molten state. The dynamic heat treatment is effected using a kneading apparatus, such as mixing roller, an intensive mixer (for example, Bumbury's mixer or kneader) or a monoaxial or biaxial extruder, wherein it is preferable to perform the dynamic heat treatment in a non-exposed kneading apparatus. The dynamic heat treatment may preferably be carried out in an inert gas, such as nitrogen gas.

The kneading may preferably be performed at a temperature at which the half-life of the organic peroxide stays no longer than one minute. The kneading temperature may favorably be in the range of, usually, 150–280° C., preferably 170–240° C., and the kneading time may usually be in the range of 1–20 minutes, preferably 1–5 minutes. The shearing force imparted to the composition upon the kneading may usually be selected within the range of $10$–$10^4$ $sec^{-1}$, preferably $10^2$–$10^4$ $sec^{-1}$, in terms of shearing speed.

The olefin thermoplastic elastomer composition according to the present invention is superior in the resistance against oils, so that the degree of swelling upon contact with a nonpolar solvent or the like, such as an organic aromatic solvent, gasoline or a mineral oil, is low. Due to the use of the resin based on olefin, the composition is light weighing and easy for reclamation by recycling it. Therefore, the olefin Thermoplastic elastomer composition according to the present invention can widely be used as an energysparing and resourcessparing elastomer and especially as a substitute for vulcanized rubber, for automobile parts, industrial machine parts, parts for electric and electronic instruments, parts for constructional purposes and so on.

For the components of the olefin thermoplastic elastomer composition according to the present invention, while those in which each component has material properties defined above as general preference may be incorporated, those in which all the components have each material properties lying within the range defined above as special preference are most preferable. However, those in which specific components exhibit material properties within the range defined as special preference but other components have material properties defined above as general preference may also be used preferably. While the blending proportion of the components to be incorporated according to the present invention may be within the range defined above as general preference, most preference is given for the composition in which all the components are incorporated each in a proportion within the range defined above as special preference. However, those in which certain components are incorporated each in a proportion within the range defined above as special preference but others are incorporated each in a proportion defined above as general preference may also be favorable.

As detailed above, the olefin thermoplastic elastomer composition according to the present invention is superior in the resistance against oils, in the heat resistance, in the formability and in the flexibility, since it contains a specific polypropylene resin and a specific copolymer rubber based on olefin together with the softener each in a specific proportion and since it is in such a cross-linked state that its gel content is at least 97% by weight.

THE BEST MODE FOR EMBODYING THE INVENTION

Below, the present invention is described by way of Examples, wherein such Examples should not be regarded as restricting the present invention in any respect. The materials employed in the Examples are as follows:

| | Polypropylene Resin (A) |
|---|---|
| (A-1) | Propylene homopolymer: MFR (according to ASTM D 1238-65T, at 230° C. under a load of 2.16 kg) = 1 g/10 minutes |
| (A-2) | Propylene homopolymer: MFR (according to ASTM D 1238-65T, at 230° C. under a load of 2.16 kg) = 15 g/10 minutes |
| | Copolymer Rubber based on Olefin (B) |
| (B-1) | An ethylene/propylene/5-ethylidene-2-norbornene copolymer rubber: Ethylene content = 78 mole %; iodine value = 14; Mooney viscosity ($ML_{1+4}$ at 100° C.) = 72 |
| | Softener (C) |
| (C-1) | A process oil based on mineral oil [PW-380 (trademark), a product of Idemitsu Kosan Co., Ltd.] |

EXAMPLE 1

90 parts by weight of a pelletized product of the propylene homopolymer (A-1), 10 parts by weight of a pelletized product of the ethylene/propylene/5-ethylidene-2-norbornene copolymer rubber (B-1), 30 parts by weight of the process oil based on mineral oil (C-1), 1.0 part by weight of 2,5-dimethyl-2,5-di-(tert-butyl-peroxy)hexane and 0.8 part by weight of divinylbenzene were mixed sufficiently and the resulting blend was extruded by a biaxial extruder with L/D=30 and a screw diameter of 50 mm under a nitrogn atmosphere at 220° C. to produce a pelletized product of an olefin thermoplastic elastomer composition.

Using this pelletized product of olefin thermoplastic elastomer composition, determination of the gel content was carried out with calculation according to the equation (1) given previously.

Further, the pelletized product of olefin thermoplastic elastomer composition was formed into a sheet having a thickness of 1 mm using a press-forming machine. This sheet was cut into test pieces of a size of 20 mm×20 mm and each test piece was soaked in a JIS No. 1 oil at 100° C. for 24 hours, whereupon the weight change rate (% ΔW) was determined from the observed weights of the test piece before and after the soaking to evaluate the resistance against oil. The results are recited in Table 1 below.

EXAMPLE 2

70 parts by weight of a pelletized product of the propylene homopolymer (A-1), 30 parts by weight of a pelletized product of the ethylene/propylene/5-ethylidene-2-norbornene copolymer rubber (B-1), 30 parts by weight of the process oil based on mineral oil (C-1), 1.0 part by weight of 2,5-dimethyl-2,5-di-(tert-butyl-peroxy)hexane and 0.8 part by weight of divinylbenzene were mixed sufficiently and the resulting blend was processed into a pelletized product of an olefin thermoplastic elastomer composition in the same manner as in Example 1.

Then, using this pelletized product of olefin thermoplastic elastomer composition, the gel content and the resistance to oil were evaluated in the same manner as in Example 1. The results are recited also in Table 1 below.

COMPARATIVE EXAMPLE 1

70 parts by weight of a pelletized product of the propylene homopolymer (A-2), 30 parts by weight of a pelletized product of the ethylene/propylene/5-ethylidene-2-norbornene copolymer rubber (B-1), 30 parts by weight of the process oil based on mineral oil (C-1), 1.0 part by weight of 2,5-dimethyl-2,5-di-(tert-butyl-peroxy)hexane and 0.8 part by weight of divinylbenzene were mixed sufficiently and the resulting blend was processed into a pelletized product of an olefin thermoplastic elastomer composition in the same manner as in Example 1.

Then, using this pelletized product of olefin thermoplastic elastomer composition, the gel content and the resistance to oil were evaluated in the same manner as in Example 1. The results are recited also in Table 1 below.

COMPARATIVE EXAMPLE 2

30 parts by weight of a pelletized product of the propylene homopolymer (A-1), 70 parts by weight of a pelletized product of the ethylene/propylene/5-ethylidene-2-norbornene copolymer rubber (B-1), 30 parts by weight of the process oil based on mineral oil (C-1), 1.0 part by weight of 2,5-dimethyl-2,5-di-(tert-butyl-peroxy)hexane and 0.8 part by weight of divinylbenzene were mixed sufficiently and the resulting blend was processed into a pelletized product of an olefin thermoplastic elastomer composition in the same manner as in Example 1.

Then, using this pelletized product of olefin thermoplastic elastomer composition, the gel content and the resistance to oil were evaluated in the same manner as in Example 1. The results are recited also in Table 1 below.

COMPARATIVE EXAMPLE 3

70 parts by weight of a pelletized product of the propylene homopolymer (A-1), 30 parts by weight of a pelletized product of the ethylene/propylene/5-ethylidene-2-norbornene copolymer rubber (B-1), 30 parts by weight of the process oil based on mineral oil (C-1), 0.2 part by weight of 2,5-dimethyl-2,5-di-(tert-butyl-peroxy)hexane and 0.2 part by weight of divinylbenzene were mixed sufficiently and the resulting blend was processed into a pelletized product of an olefin thermoplastic elastomer composition in the same manner as in Example 1.

Then, using this pelletized product of olefin thermoplastic elastomer composition, the gel content and the resistance to oil were evaluated in the same manner as in Example 1. The results are recited also in Table 1 below.

TABLE 1

|  | Examples | | Comparative Examples | | |
| --- | --- | --- | --- | --- | --- |
|  | 1 | 2 | 1 | 2 | 3 |
| Composition (part by wt.) | | | | | |
| A-1 | 90 | 70 | — | 30 | 70 |
| A-2 | — | — | 70 | — | — |
| B-1 | 10 | 30 | 30 | 70 | 30 |
| C-1 | 30 | 30 | 30 | 30 | 30 |
| Org. peroxide* | 1.0 | 1.0 | 1.0 | 1.0 | 0.2 |
| Divinylbenzene | 0.8 | 0.8 | 0.8 | 0.8 | 0.2 |
| Gel content (wt. %) | 98 | 98 | 98 | 97 | 43 |
| Oil resistance (% Δ W)** | 19 | 26 | 159 | 185 | 116 |

Notes:
*2,5-dimethyl-2,5-di-(tert-butylperoxy)hexane
**JIS No. 1 oil, 100° C., 24 hours It is seen from Table 1, that the compositions of Examples 1 and 2 bring about a superior resistance to oil, whereas the compositions of Comparative Example 1 in which a polypropylene resin having a high MFR was used, of Comparative Example 2 in which polypropylene resin was incorporated in a low proportion and of Comparative Example 3 in which the gel content was low exhibit inferior resistance to oil.

The invention claimed is:

1. An olefin thermoplastic elastomer composition having superior resistance to oils, comprising the components
(A) 70–90 parts by weight of a polypropylene resin having a melt flow rate (determined at 230° C. under a load of 2.16 kg according to ASTM D 1238) of 0.1–3 g/10 minutes,
(B) 10–30 parts by weight of a copolymer rubber based on olefin, the contents of the components (A) and (B) summing up to 100 parts by weight,
wherein the copolymer rubber based on olefin consists of one or more rubbers selected from the group consisting of copolymer rubbers consisting of ethylene/another α-olefin; copolymer rubbers consisting of ethylene/another α-olefin/non-conjugated diene which diene is selected from the group consisting of dicyclopentadiene, 1,4-hexadiene, cyclooctadiene, methylene norbornene and ethylidene norbornene; copolymer rubbers consisting of propylene/another α-olefin; and copolymer rubbers consisting of butene/another α-olefin, and
(C) 20–150 parts by weight of a softener, wherein the composition is melt-kneaded in the presence of an organic peroxide to bring it into a cross-linked state such that the gel content thereof amounts to 97% by weight or higher.

2. A process for preparing an olefin thermoplastic elastomer composition which is superior in resistance to oils, comprising the components:
(A) 70–90 parts by weight of a polypropylene resin having a melt flow rate (determined at 230° C. under a load of 2.16 kg according to ASTM D 1238) of 0.1 to 3 g/10 minutes,
(B) 10–30 parts by weight of a copolymer rubber based on olefin, the contents of the components (A) and (B) summing up to 100 parts by weight,
wherein the copolymer rubber based on olefin consists of one or more rubbers selected from the group consisting of copolymer rubbers consisting of ethylene/another α-olefin; copolymer rubbers consisting of ethylene/another α-olefin/non-conjugated diene which diene is selected from the group consisting of dicyclopentadiene, 1,4-hexadiene, cyclooctadiene, methylene norbornene and ethylidene norbornene; copolymer rubbers consisting of propylene/another α-olefin; and copolymer rubbers consisting of butene/another α-olefin, and
(C) 20–150 parts by weight of a softener,
the said process comprising kneading the starting composition in a molten state in the presence of an organic peroxide to effect cross linking of the composition to a gel content of 97 % by weight or higher.

3. A method for improving resistance to oils of an elastomer composition comprising the components:
(A) 70–90 parts by weight of a polypropylene resin having a melt flow rate (determined at 230° C. under a load of 2.16 kg according to ASTM D 1238) of 0.1–3 g/10 minutes,
(B) 10–30 parts by weight of a copolymer rubber based on olefin, the contents of the components (A) and (B) summing up to 100 parts by weight, wherein the copolymer rubber based on olefin consists of one or more rubbers selected from the group consisting of copolymer rubbers consisting of ethylene/another α-olefin; copolymer rubbers consisting of ethylene/another α-olefin/non-conjugated diene which diene is selected from the group consisting of dicyclopentadiene, 1,4-hexadiene, cyclooctadiene, methylene norbornene and ethylidene norbornene; copolymer rubbers consisting of propylene/another α-olefin; and copolymer rubbers consisting of butene/another α-olefin, and
(C) 20–150 parts by weight of a softener,
the said method comprising subjecting the composition to cross linking by kneading the composition in a molten state in the presence of an organic peroxide to effect cross linking of the composition to a gel content of 97% by weight or higher.

* * * * *